United States Patent [19]

Johnson et al.

[11] Patent Number: 4,830,159
[45] Date of Patent: May 16, 1989

[54] MULTI-DISK SYNCHRONIZER

[75] Inventors: Douglas R. Johnson, Waterloo, Iowa; Randy P. Kruse, Troy, Mich.

[73] Assignee: Deere & Company, Moline, Ill.

[21] Appl. No.: 149,790

[22] Filed: Jan. 29, 1988

[51] Int. Cl.⁴ .......................................... F16D 23/08
[52] U.S. Cl. .............................. 192/53 G; 192/53 F; 74/339
[58] Field of Search ............... 192/53 F, 53 G, 53 R, 192/53 E; 74/339

[56] References Cited

U.S. PATENT DOCUMENTS

| | | | |
|---|---|---|---|
| 4,349,090 | 9/1982 | Griesser | 192/53 G |
| 4,413,715 | 11/1983 | Michael et al. | 192/53 F |
| 4,475,639 | 10/1984 | Tausend | 74/339 |
| 4,540,074 | 9/1985 | Magg et al. | 192/53 G |
| 4,566,569 | 1/1986 | Eriksson | 192/53 G |

FOREIGN PATENT DOCUMENTS

| | | | |
|---|---|---|---|
| 2243522 | 4/1973 | Fed. Rep. of Germany | 192/53 F |
| 2510657 | 9/1976 | Fed. Rep. of Germany | 192/53 F |
| 2820774 | 11/1979 | Fed. Rep. of Germany | 192/53 F |

Primary Examiner—Leslie A. Braun
Assistant Examiner—David A. Testardi

[57] ABSTRACT

A multi-disk synchronizer is provided wherein the complicated portions of the elements required for the neutral detent mechanism, the blocking mechanism and to prevent overtravel of the shift collar all are provided in a blocking insert held in a slot in the shift collar. The blocking insert preferably is cast, and this mechanism can be used with any type of synchronizer. In addition, the synchronizer rings for the multi-disk synchronizer is formed by stamping and pressing heavy sheet metal rather than by casting and machining a part. The combination of the blocking insert and the stamped synchronizer rings significantly reduces the machining required to manufacture the synchronizer.

29 Claims, 6 Drawing Sheets

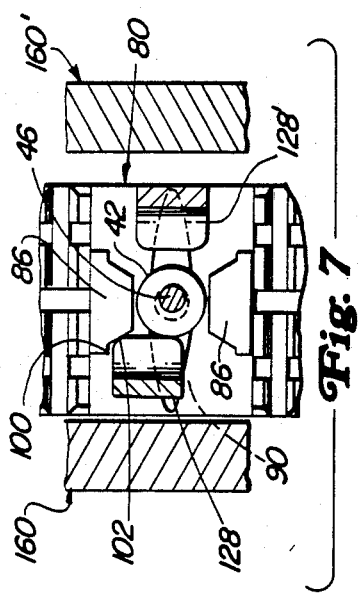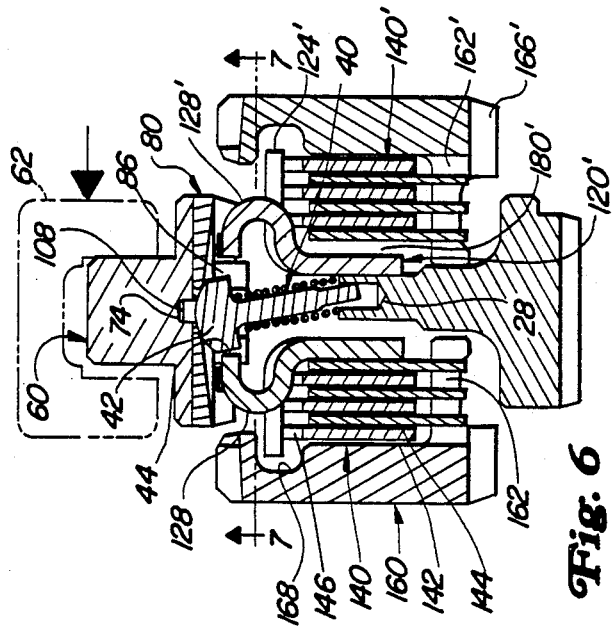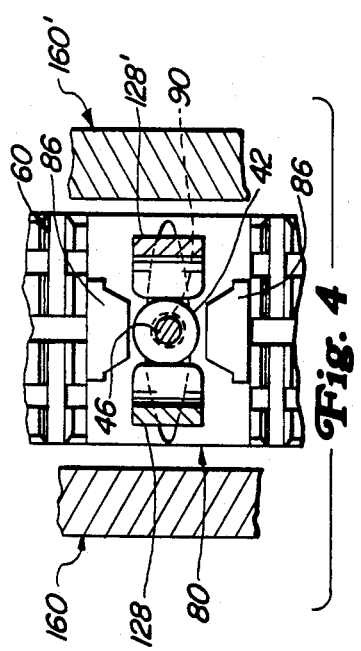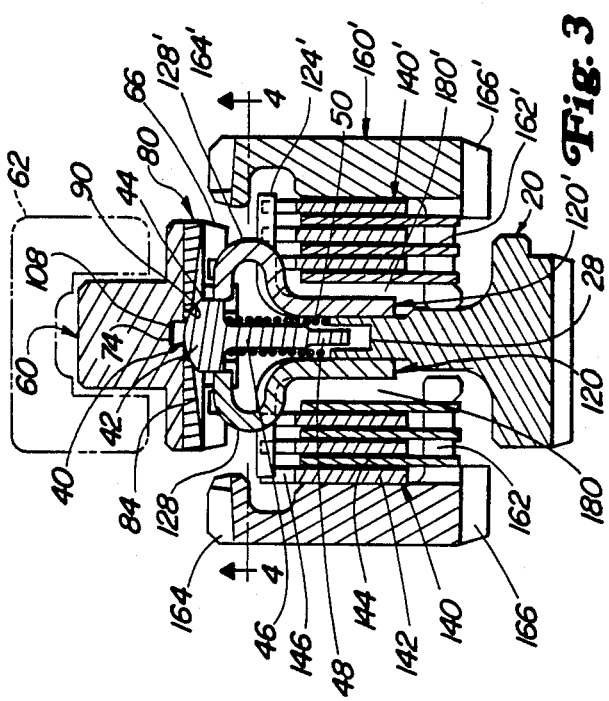

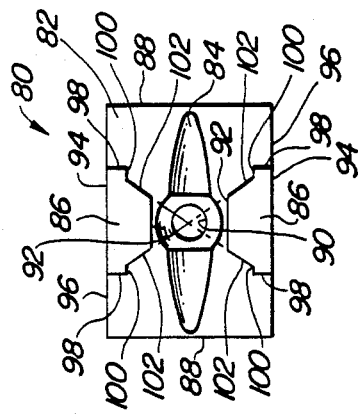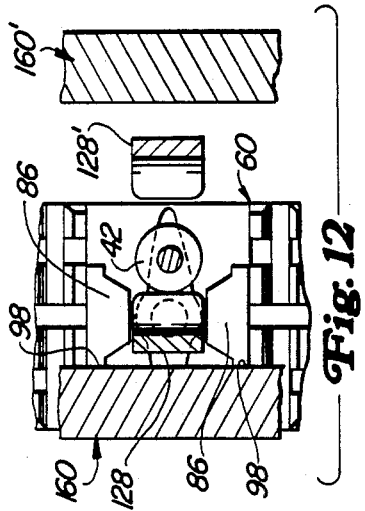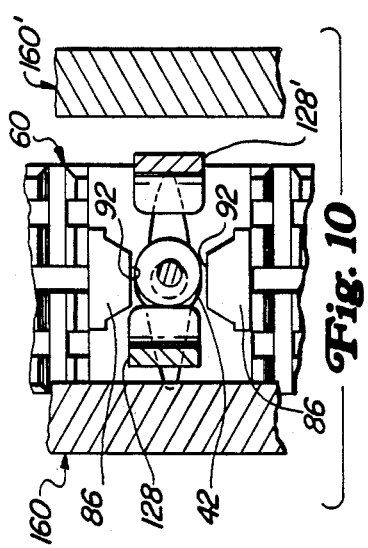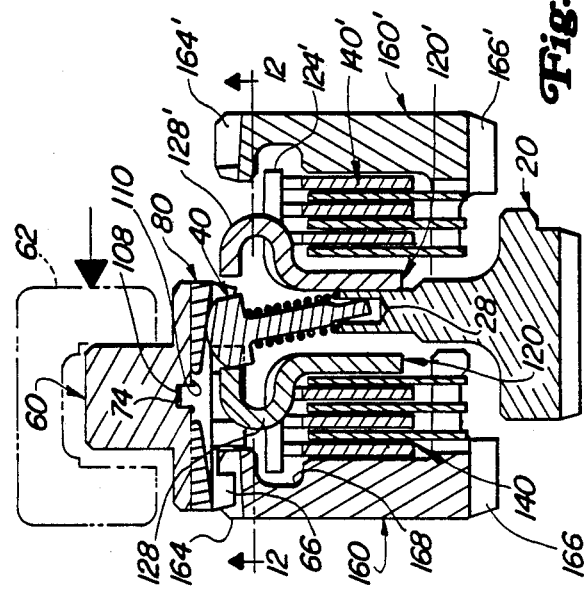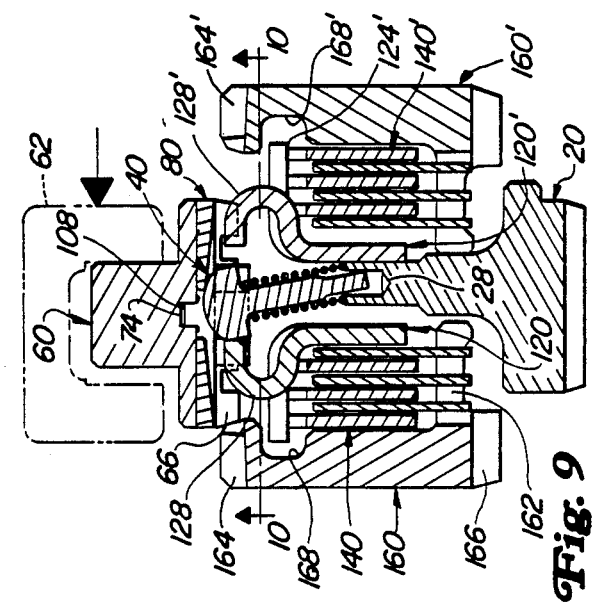

MULTI-DISK SYNCHRONIZER

BACKGROUND OF THE INVENTION

1. Field of the Invention

The present invention relates to multi-disk synchronizers, particularly of the type used in heavy-duty synchromesh transmissions.

2. Discussion of the Related Art

It is well known to use synchronizers to provide clash-free shifting of gears in a transmission for a motor vehicle, creating a so-called synchromesh transmission. In such a transmission, a gear is rotatably mounted around a shaft. A hub is mounted for rotation with the shaft, and a shift collar is mounted around the hub such that it is axially movable relative to the hub. The inner surface of the shift collar and the outer surfaces of the hub and gear (or an output drum connected to the gear) are splined, so that when the shift collar moves axially towards the gear (or output drum), the splines engage. This provides a positive connection between the shaft and the gear via the hub and shift collar.

Without more, this would be a clash-type transmission, which could be shifted only when the shaft and gear are sitting still, since the splines on the shift collar and the gear would not align if there was any relative rotation therebetween. The function of a synchronizer is to eliminate relative rotation between the gear and hub, without requiring that the two be at rest. The splines of the shift collar and gear then can engage while the vehicle is still moving.

Virtually all synchronizers use friction to eliminate relative rotation between the gear and hub. The simplest and most common synchronizers provide two adjacent conical surfaces, one connected to the gear and one to the shift collar, e.g., as taught in U.S. Pat. Nos. 4,349,090 (Griesser) and 4,566,569 (Eriksson). When the shift collar is axially shifted in the direction of the gear, the two conical surfaces engage, and friction will eliminate any relative rotation therebetween. The splines of the shift collar then can mesh with the splines of the gear.

The size of the friction surfaces needed for the synchronizer to work properly depend on the amount of momentum and energy which must be transferred to bring the gear to the same speed as the hub. The heavier-duty the transmission, the more massive the gears, and therefore the larger the friction surface needed for the synchronizer. In particularly heavy-duty transmissions, e.g., those used on agricultural and construction vehicles, the cone size which would be necessary to obtain the required frictional surface area in a cone-type synchronizer becomes very large, creating an unacceptably large synchronizer. Some such transmissions therefore instead use multiple inter-leaved disks to carry the friction surfaces, much as in a clutch. Such a technique is used in the synchronizers in the Quad-Range transmission used on John Deere Row Crop Tractors and in the transmission used on John Deere 4WD Articulated Tractors, which are extremely large, heavy work vehicles. Alternatively, a synchronizer can use a mix of cone and disk surfaces, e.g., as taught in U.S. Pat. No. 4,413,715 (Michael et al.).

Regardless of the particular type of friction surfaces employed, all synchronizers have a common requirement that the shift collar must be blocked temporarily from moving far enough for its splines to engage the gear splines until the synchronizer has eliminated relative rotation therebetween. A great many different techniques have been developed to provide such blocking. The above-mentioned patents us a variety of different techniques.

Most synchronizers also have some form of neutral detent mechanism which holds the shift collar and the friction surfaces in disengaged positions when no gears are to be engaged. Again, a great many technique have been developed to provide such a netural detent, and several are shown in the above-mentioned patents.

Another problem common to virtually all synchronizers is that manufacturing them takes substantial amounts of machining. This is particularly a problem with the components used to momentarily block axial movement of the shift collar. Naturally, the more machining required, the higher the cost, and as a result, synchronizers tend to be a very expensive part of a transmission.

SUMMARY OF THE INVENTION

The purpose of the present invention is to provide a heavy duty synchronizer which ca be manufactured with significantly reduced amounts of machining.

This purpose is accomplished according to a first aspect of the invention by using a blocking insert, which can be used with any type of synchronizer. In the preferred embodiment of the present invention, all of the complicated structures required for blocking, as well as those required for the neutral detent mechanism and for preventing overtravel of the shift collar, are formed on a small blocking insert, which preferably is formed by casting. This blocking insert includes blocking shoulders, a synchronizer stop, a shift stop and a guide groove and hole for the detent mechanism. All that need be mounted to other elements of the synchronizer are a flange to engage the blocking shoulders and synchronizer stop, and the actual detent pin and spring of the detent mechanism to engage the detent guide groove and hole. These are simple parts which do not require a great deal of machining. Since the insert itself is cast rather than machined, a substantial amount of machining is totally eliminated.

According to a second aspect of the present invention, a cup-shaped synchronizer ring for a multi-disk synchronizer is made out of stamped and pressed heavy-gauge sheet metal. Such rings guide the disks and press them together during synchronization. They heretofore have been formed primarily by casting and machining.

According to the present invention, the synchronizer ring instead is formed simply by stamping and pressing a piece of sheet metal. Using this technique, the flange required to cooperate with the blocking insert may be formed simply by bending back a portion of the sychronizer ring. Similarly, in a bi-directional synchronizer, additional flanges may be bent back to mount biasing springs. All this may be accomplished without any significant machining.

As will be apparent, the machining required to manufacture a synchronizer according to the present invention is significantly reduced. Much more efficient casting and stamping operations are used instead. This provides a synchronizer having a very high capacity versus cost value.

BRIEF DESCRIPTION OF THE DRAWINGS

The present invention will be described in more detail with reference to the following figures in which:

FIG. 3 is a view along line 3—3 in FIG. 2.

FIG. 4 is a view along line 4—4 in FIG. 3.

FIG. 6 is a view along line 6—6 in FIG. 5.

FIG. 7 is a view along line 7—7 in FIG. 6.

FIG. 9 is a view along line 9—9 in FIG. 8.

FIG. 10 is a view along line 10—10 in FIG. 9.

FIG. 11 is a view analogous to FIG. 9 after the shift operation is complete.

FIG. 12 is a view along line 12—12 in FIG. 11.

FIG. 13 is a plan view of the front side of a blocking insert according to the present invention.

DETAILED DESCRIPTION OF THE PREFERRED EMBODIMENTS

Figure 1:
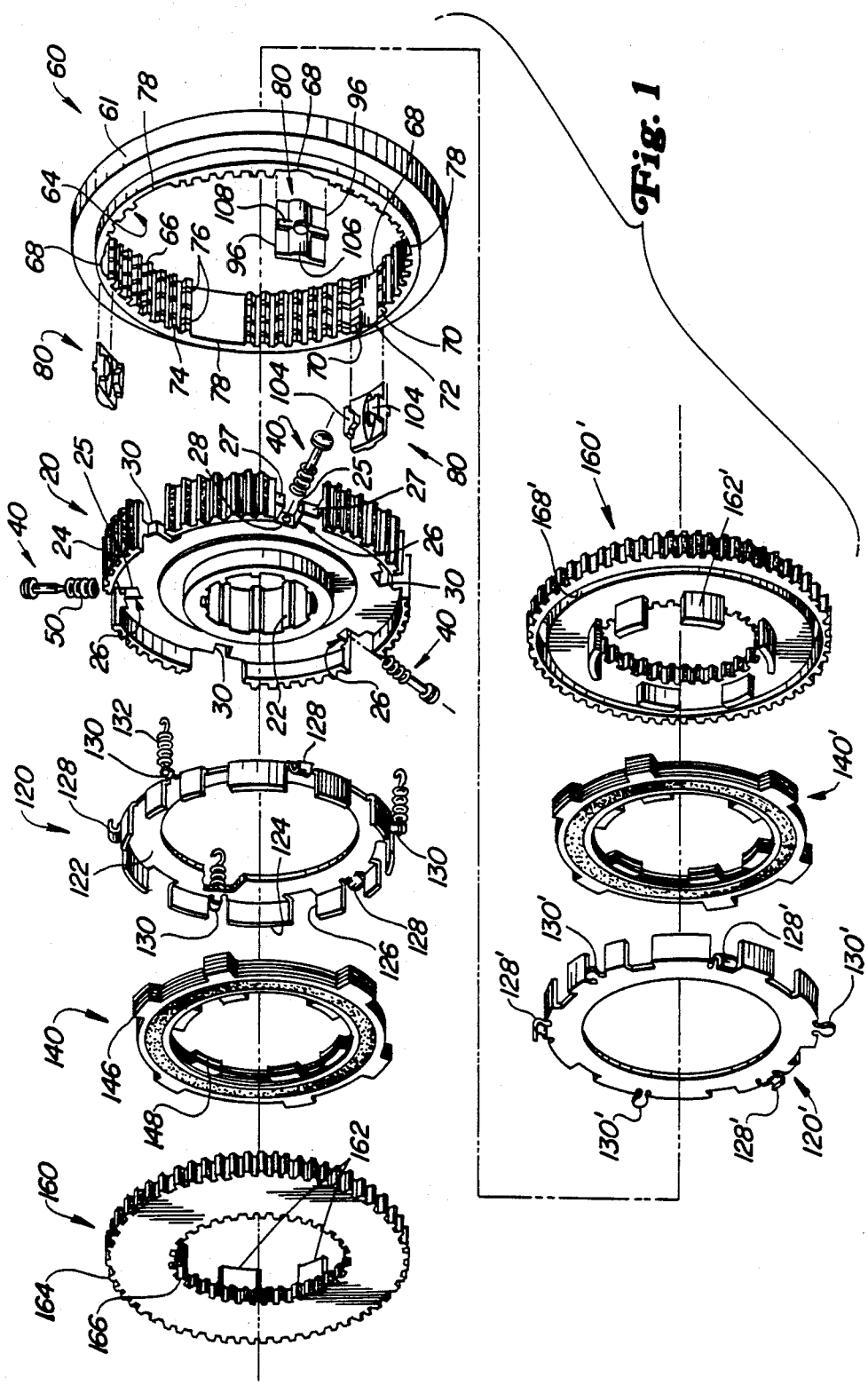
FIG. 1 is an exploded isometric view of a preferred embodiment of the synchronizer according to the present invention.

The synchronizer shown in FIG. 1 is a bi-directional synchronizer capable of connecting either of two gears (not shown) to a shaft (not shown). Due to page size limitations, this exploded view is shown on two levels in FIG. 1, with the elements which would be to the right if all elements were properly aligned shown on the lower level. For convenience, these elements on the lower level will be referred to herein as the right-hand elements. These right-hand elements are substantially symmetrical to elements shown on the left side of the top portion of FIG. 1 and will be indicated throughout with the same number as the elements on the left, plus a prime ('). These right-hand elements will not be described in detail, since they are substantially symmetrical to the left-hand elements bearing the same numbers.

The synchronizer shown in FIG. 1 has several main elements: a hub 20, three detent mechanisms 40, a shift collar 60, three blocking inserts 80, left and right synchronizer rings 120, 120', left and right clutch packs 140, 140' and left and right output drums 160, 160'.

The hub 20 is fixed for rotation with a transmission shaft (not shown) by any suitable means, e.g., splines 22. The hub 20 also normally will be fixed by some suitable means, e.g., lock rings (not shown), against axial movement along the shaft. The outer circumference of the hub also is splined, and these splines 24 run parallel to the axis of rotation of the shaft. Three notches 26 having holes 28 in the base thereof to receive the detent mechanisms 40 are spaced around the outer circumference of the hub 20. The notches 26 are substantially T-shaped, having surfaces 27 extending to the sides of the main notch 26 and outer sides 29 extending to the edge of the hub 20. If desired, the inner edges 25 of the notches 26 can have several steps (not shown) to provide additional clearance. The notches 26 alternate with notches 30, the function of which will be described below. The notches 26 and 30 may conveniently be formed in the same shape to simplify milling requirements, although this is not essential.

As best seen in FIG. 3, each detent mechanism 40 has a rounded or frustoconical head 42 ending in a substantially cylindrical section 44. The head 42 is mounted to a pin 46. The pin has a tapered portion 48 at the end opposite from the head 42. A spring 50 surrounds the pin 46. When in place, the tapered portion 48 is inserted into the corresponding hole 28 in the hub 20. The tapered portion 48 is slightly smaller in diameter than the hole 28, allowing play therebetween. One end of the spring 50 presses against the bottom of the notch 26 and the other against the base of the head 42 to bias the detent mechanism 40 away from the center of the hub 20. When the synchronizer is fully assembled, each detent mechanism 40 will press against a corresponding one of the blocking inserts 80, which will be described in greater detail below.

Returning to FIG. 1, the shift collar 60 has an outer surface 61 adapted to be shifted in the usual fashion by a shift fork 62 (shown in dashed lines in FIG. 3). The inner surface 64 of the shift collar 60 bears splines 66 which match and engage the splines 24 of the hub 20 when the synchronizer is assembled. Three axially extending slots 68 are formed in the inner surface 64 of the shift collar 60 to receive the blocking inserts 80. Each slot has two side portions 70 which preferably are of substantially constant radius about the central axis of the shift collar 60, although for a large enough shift collar 60, this means they are substantially flat. The central portion 72 of each slot is formed as a segment of a cylinder, with the main axis of the cylinder parallel to the axis of the shift collar 60. At least one circumferential groove 74 is formed around the inner surface 64 of the shift collar 60 having a radius somewhat greater than the radius of the side portion 70 of the blocking insert receiving slots 68. Additional grooves 76 also preferably are provided to aid in spline engagement, in the fashion described below. These grooves 76 need not be as deep as the groove 74. Finally, splines may be omitted in the regions 78 on the shift collar 60 corresponding to the position of the slots 30 in the hub 20, since there are no splines on the hub 20 to be engaged by any splines which might be formed in the regions 78 on the shift collar 60.

As best seen in FIGS. 3 and 13, each blocking insert 80 has a main body 82 shaped to match the curvature, if any, of the outer portions 70 of the blocking insert receiving slots 68 formed in the shift collar 60. The front side of each blocking insert 80 has a groove 84 formed therein for engagement by the corresponding detent mechanism 40, and two protrusions 86, the function of which will be described below. The groove 84 increases both in depth and width from the sides 88 of the blocking insert 80 towards its center. A hole 90 is formed in the blocking insert at the center thereof. The head 42 of the corresponding detent mechanism 40 is guided in this groove 84 with the hole 90 providing a stable position for the detent mechanism 40 in the neutral position, as discussed further below.

Focusing on FIG. 13, the protrusions 86 are substantially symmetrical. Each protrusion 86 has inner and outer sides 92, 94. The inner sides 92 are substantially parallel to the sides 96 of the blocking insert 80 and are spaced slightly from the hole 90. The outer sides 94 of the protrusions 86 are substantially contiguous with the sides 96 of the blocking insert 80. Short sides 98 are formed at each end of the outer sides 94 substantially perpendicular thereto and extending into the blocking insert. These short sides 98 serve as shift stops, as discussed below, and will be referred to as such hereinafter. Each protrusion 86 has two more short sides 100, one extending from the end of each shift stop 98. These sides 100 serve as synchronizer ring stops, as discussed below, and will be referred to as such hereinafter. Finally, slanted sides 102 connect the ends of synchronizer ring stops 100 to the ends of the inner sides 92. These sides 102 serve as guide shoulders, as discussed below, and will be referred to hereinafter as such. Preferably, the guide shoulders 102 are oriented radially from the center of the blocking insert, as indicated by the dashed lines. As best seen in FIG. 1, the top surface 104 of each protrusion is substantially flat.

Continuing with FIG. 1, additional protrusions are formed on the back of each blocking insert 80. In particular, a cylindrical protrusion 106 extends from one side 88 to the other side 88 of the blocking insert 80. The shape of the cylindrical protrusion 106 corresponds to the shape of the cylindrical portion 72 of the slots 68 formed in the shift collar 60. A substantially rectangular protrusion 108 also is formed on the back of the blocking insert 80, extending from one side 96 to the other side 96, and corresponds t the groove 74 formed in the shift collar 60. The rectangular protrusion 108 is interrupted at its center by the hole 90. Finally, grooves 110 preferably are formed on either side of protrusion 108, as best seen in FIG. 11, to provide clearance between the blocking insert 80 and the edges of groove 74.

Upon assembly, each blocking insert 80 is inserted into a corresponding one of the blocking insert receiving slots 68 formed in the shift collar 60. The main body portion 82 of the blocking insert 80 engages the side portions 70 of the slot 68, the cylindrical protrusion 106 engages the cylindrical portion 72 of the slot 68 and the rectangular protrusion 108 engages the groove 74. These various engagements prevent movement of the blocking insert 80 in any direction except circumferentially and radially inward. Such circumferential and radially inward movement is prevented by engagement with the hub 20. In particular, when the shift collar 60 with blocking inserts 80 in slots 68 is placed over the hub 20, the top surfaces 104 of the protrusions 86 on the blocking inserts 80 engage the T-surfaces 27 of each notch 26, which prevents radially inward motion of the blocking inserts 80. Similarly, the sides 96 of the blocking inserts 80 engage the outer sides 29 of each notch 26, which prevents circumferential motion of the blocking inserts 80. Thus, the blocking inserts 80 are precisely positioned relative to the hub 20 and shift collar 60 by the various protrusions and slots formed in the hub 20, shift collar 60 and blocking inserts 80.

The blocking inserts are preferably formed by casting, thereby avoiding the need for expensive milling. As will be apparent from the discussion of the operation of the present invention below, the blocking inserts 80 must be of fairly high hardness. Applicant has found that SAE 8620 steel carbonized, then quenched, serves well. One additional function of the cylindrical segment 106 should be noted, and that is to provide additional material under the guide groove 84. This ensures that the material remains thick enough to be hard even at the deeper portions of the groove.

The synchronizer ring 120 is formed by stamping and then pressing a sheet of heavy-gauge sheet metal. A radially extending portion 122 separates the hub 20 from the clutch pack 140. A plurality of axially extending portions 124 circumferentially surround the clutch pack 140. Gaps 126 are spaced around the circumference of the synchronizer ring 120 to engage the clutch pack 140. At three locations around the synchronizer ring 120, the metal which otherwise would form part of the circumferential portion 124 is bent back to form flanges 128, each of which will engage the cylindrical portion 44 of the head 42 of a corresponding detent mechanism 40, as best seen in FIGS. 3 and 4. Although the flanges could simply be a straight piece of metal, for strength, they preferably are bent into a U-form. The flanges also may be spot welded to the adjacent circumferential portions 124 of the synchronizer ring 120 for added strength. Tempering and hardening also is advisable. Flanges 130, best seen on the right-hand synchronizer ring 120', also are bent back from the metal which otherwise would form part of the circumferential portion 124. Return springs 132 are connected to each of the flanges 130 and extend through the slots 30 formed in the hub 20 to connect to the corresponding flanges 130' on the right-hand synchronizer ring 120', thereby biasing the two synchronizer rings 120, 120' towards each other. The flanges 130 normally need not be hardened like the flanges 128.

The clutch pack 140 is made up of the usual clutch plates 142 inter-leaved with the usual separator plates 144, as best seen in FIG. 3. Any suitable clutch plates and separators may be employed. Returning to FIG. 1, the usual tabs 146 extend from the clutch plates 142 to engage the gaps 126 formed in the circumferential portion 124 of the synchronizer ring 120, thereby ensuring rotation of the synchronizer ring 120 and the clutch plates 122. Separator plates 144 have similar tabs 148 for engagement with the output drum 160.

The output drum 160 has a plurality of axially extending tabs 162 which fit inside the clutch pack 140. The tabs 162 engage the tabs 148, thereby ensuring corotation of the output drum 160 and the separator plates 144. The outer circumference of the output drum has splines 164 which match the splines 124 on the hub 20. Axial movement of the shift collar 60 can engage the splines 66 of the shift collar 60 with the splines 164 of the output drum 160. The splines 164 and/or the splines 66 preferably are tapered at their ends for easier engagement, as best seen in FIG. 3. The output drum 160 is connected for corotation with a gear (not shown), e.g., via splines 166 on the inner circumference of the output drum 160. Preferably, a groove 168 (best seen on the right-hand output drum 160') is formed just inside the outer perimeter of the output drum 160 to provide clearance for the ends of the circumferential portions 124 of the synchronizer ring 120.

Operation

The operation of the above-described preferred embodiment of the synchronizer according to the present invention will now be described with reference to FIGS. 2-12.

Figure 2:
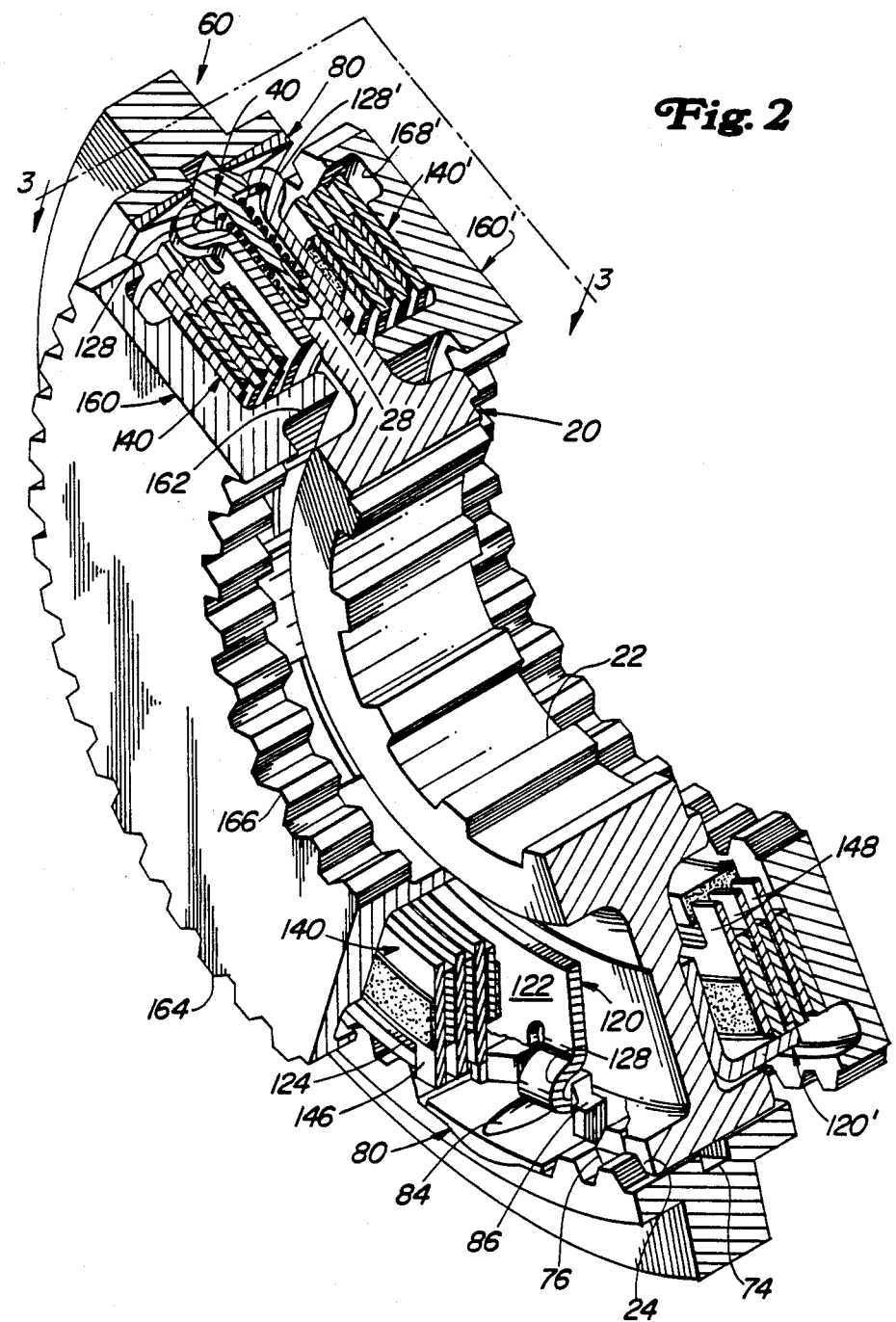
FIG. 2 is a cutaway view of the synchronizer of FIG. 1 shown in neutral position.

FIGS. 2-4 illustrate the preferred embodiment of the synchronizer according to the present invention in a neutral position. In this position, the springs 132 pull the two synchronizer disks 120, 120' together adjacent to the hub 20. This creates a gap 180, 180' between the synchronizer rings 120, 120' and their respective clutch packs 140, 140', as shown in FIG. 3. This in turn means that the clutch plates 142, 142' are able to rotate relative to the separator plates 144, 144', so that there is no connection between the hub 20 and either of the output drums 160, 160'. The synchronizer is held in this position in the absence of force on the shift collar 60 because the head 42 of the detent mechanism 40 is held stably in the hole 90 of the blocking insert 80.

To engage the synchronizer, shift fork 62 is used to move the shift collar 60 towards one of the output drums 160, 160' in the usual fashion. Such shift forks and the mechanisms for moving them are well known to those skilled in the art and will not be described herein.

Figure 5:
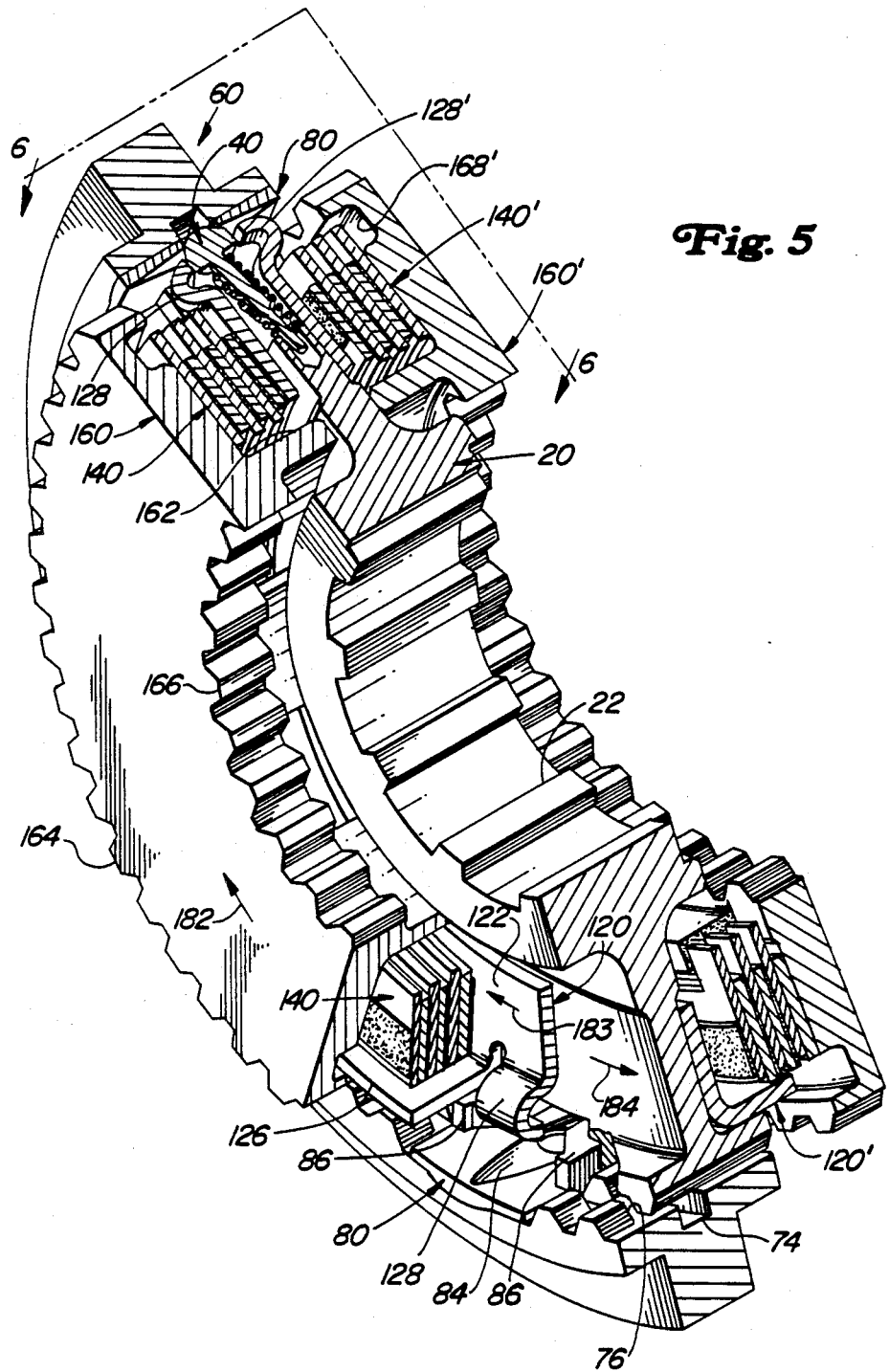
FIG. 5 is a cutaway view similar to FIG. 2 of the synchronizer shortly after commencement of a shift operation.

FIGS. 5-7 illustrate the synchronizer shortly after commencement of a shift operation to connect the output drum 160 to the hub 20. The shift fork 62 moves the shift collar 60 towards the output drum 160, which is to the left in the figures. As the shift collar 60 moves to the left, it forces the head 42 of the detent mechanism 40 to the left as well. The play between the tapered portion 148 of the pin and the hole 28 in the hub 20 allows the detent mechanism 40 to pivot slightly, as best seen in FIG. 6. This pivoting is aided further by the curved upper surface of the head 42. As the detent mechanism 40 is forced to the left, the cylindrical segment 44 thereof presses against the flange 128 of the synchronizer ring 120. This in turn forces the synchronizer ring 120 against the clutch pack 140 and eliminates the previously existing gap 180. Continued pressure on the flange 128 forces frictional engagement between the clutch plates 142 and the separators 142.

Figure 8:
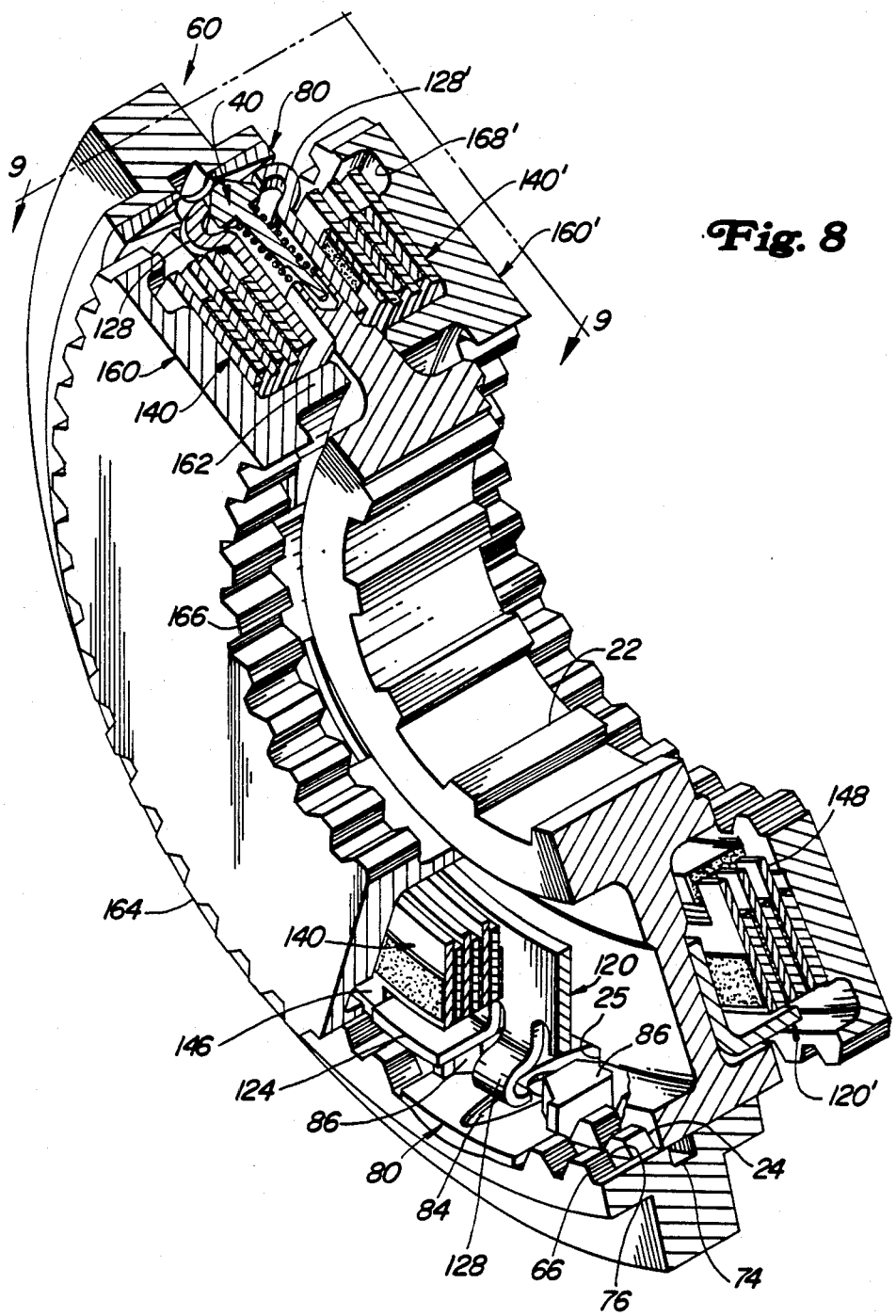
FIG. 8 is a cutaway view similar to FIG. 2 of the synchronizer after synchronization has been accomplished but before the shift operation is complete.

If there is any relative rotation between the hub 20 and the output drum 160, this initial frictional engagement will force the synchronizer ring 120 to move in the direction that the output drum 160 is rotating relative to the hub 20. For purposes of this description, it is assumed that the hub 20 and output drum 160 are moving relative to each other in the directions indicated by the arrows 182, 184 in FIG. 5. Thus, the initial frictional engagement will cause the synchronizer ring 120 to index in the direction of the arrow 183. As it does so, the flange 128 will initially abut against the guide shoulder 102 on the protrusion 86 on the side of the insert 80 in the direction of the arrow 183. If there is a sufficient difference in speed between the hub 20 and the output drum 160, the flange 128 will continue moving in this direction until it hits the synchronizer ring stop 100 (see FIG. 7) or the inner edge 25 of the notch 26 in hub 20 (which is roughly aligned with the synchronizer ring stop 100, as best seen in FIG. 8), at which point it can progress no further. Continued frictional engagement between the clutch plates 142 and the separators 140 then serves to slow the relative rotation between the hub 20 and the output drum 160.

While this synchronization process is underway, the shift collar 60 is prevented from moving further towards the output drum 160 because the flange 128 abuts against the shoulder 86 of the blocking insert 80. While pressure from the shift collar 60 tends to force the flange 128 down the guide shoulder 102 towards the center of the blocking insert 80, the frictional forces on the synchronizer ring 120 easily overcome this force and hold the flange 128 up against the synchronizer ring stop 100.

Note that during this entire process, the return springs 132 hold the right-hand synchronizer ring 120' against the hub 20. The gap 180' remains in existence, so that there is no frictional engagement within the clutch pack 140', and the output drum 160' remains in neutral.

Turning to FIGS. 8-10, eventually the frictional engagement between the clutch plates 142 and the separators 144 will eliminate relative rotation between the hub 20 and the output drum 160, i.e., they will be synchronized. In the absence of frictional forces on the synchronizer ring 120 to force the flange 128 against the synchronizer ring stop 100 or the guide shoulder 102, continued leftward pressure by the shift collar 60, combined with the force of return springs 132, will force the flange 128 down the guide shoulder 102 towards the center of the blocking insert 80. As best seen in FIG. 10, the flange 128 is sized to be less than the distance between the inner sides 92 of the two protrusions 86 on the blocking insert 80. Thus, when the flange 128 has moved down the guide shoulder 102 and is aligned with the channel formed between the two inner sides 92, the protrusions 86 no longer block movement of the shift collar 60, and tee shift collar 60 can continue to move towards the output drum 160. The splines 66 on the shift collar 60 then will engage the splines 164 on the output drum 160, providing positive engagement between the hub 20 and the output drum 160.

Continuing with FIGS. 11 and 12, the shift collar 60 is prevented from moving past the output drum 160 by the shift stops 98 formed on the protrusions 86 of the blocking insert 80. As the shift collar 60 moves to the left, the shift stops 98 eventually will abut against the surface of the output drum 160, preventing further movement i this direction. Movement of the shift collar 60 to this position also forces the detent mechanisms 40 down into the hub 20 as they ride up along the grooves 84 in the blocking inserts 80. The edges of the groove 76 in the shift collar 60 on the side of the output drum 160 also can now come into play to aid in locking the shift collar splines 66 to the output drum splines 164, by very slightly biting into the splines 164.

To return to the neutral position, the shift collar 60 is simply moved to the right until it is back in the position shown in FIGS. 2-4. As it does so, the detent mechanisms 40 move into the deeper portions of the grooves 84 in the blocking inserts 80, and eventually resume their stable positions in the holes 90. Similarly, the return springs 132 pull the synchronizer ring 120 against the hub 20, again creating the gap 180.

Shifting of the sychronizer to connect the hub 20 to the output drum 160' is substantially identical to the shift operation to engage the output drum 160, and therefore will not be described further herein.

While the present invention has been described with respect to a particular embodiment thereof, it is to be understood that numerous modifications can be made thereto. For example, while the blocking insert and detent mechanism have been described in the context of a multiple disk synchronizer, the same mechanisms could be used with cone or other type synchronizers. All that would be required is that a part equivalent to the flange 128 herein be attached to the part of the synchronizer bearing the friction surfaces which rotate at substantially the same speed as the hub 20. For cone-type synchronizers, this would mean the hub cone. Thus, the extremely simplified blocking and detent mechanism provided by the present blocking insert can be used with any form of synchronizer, not just a multiple disk synchronizer.

Similarly, while the blocking inserts have been shown mounted to the shift collar and the detent mechanisms to the hub, their positions could be reversed. The hub and shift collar always corotate, so no problem of angular positioning would arise from such a modification.

Additionally, although the preferred embodiment described is a bi-directional synchronizer, the present invention could be used with a uni-directional synchronizer All of the elements described with a prime herein then could simply be omitted, and the return springs 132 preferably would be connected directly to the hub 20 rather than to the now non-existent right-hand synchronizer 120'. Similarly, the surfaces 98, 100, 102 on the right-hand side of the protrusions 86 in the blocking insert 80 could be omitted, if desired, in such a uni-directional synchronizer.

Since other changes will be readily apparent to one of ordinary skill in the art, it is intended that the present invention be limited only by the following claims.

I claim:

1. A synchronizer comprising:
   a hub;
   a shift collar fixed for rotation with and axially movable relative to said hub;
   at least one output member mounted for rotation relative to said hub;
   at least one input friction element mounted for rotation relative to both said hub and said at least one output member;
   at least one output friction element mounted for rotation with said at least one output member;
   at least one detent mechanism mounted on one of said hub and said shift collar and biased towards the other one, each said detent mechanism being selectively engageable with said at least one input friction element upon axial movement of said shift collar towards said at least one input friction element; and
   at least one blocking insert, each said blocking insert being mounted on said other one of said hub and said shift collar at a position adjacent to each said at least one detent mechanism, each said at least one detent mechanism being biased against the corresponding blocking insert, and each blocking insert having:
      groove means for guiding the corresponding detent mechanism as said shift collar is moved axially relative to said hub;
      synchronizer stop means for limiting rotation of said at least one input friction element relative to said hub; and
      blocking means for limiting axial movement of said shift collar relative to said hub when said hub and said output member are rotating relative to one another.

2. The synchronizer of claim 1 wherein said blocking insert further comprises shift stop means for limiting axial movement of said shift collar relative to said hub when said hub and said output member are not rotating relative to one another.

3. The synchronizer of claim 1 wherein said groove means includes means for stably holding said detent mechanism and said shift collar in a neutral position.

4. The synchronizer of claim 1, wherein said blocking insert further comprises means for orienting said blocking insert relative to said hub and shift collar 5. The synchronizer of claim 1, wherein said blocking insert has protrusions on a face thereof adjacent to said detent mechanism, said protrusions serving as said synchronizer stop means and said blocking means.

6. The synchronizer of claim 5, wherein said protrusions on said blocking insert further serve as shift stop means for limiting axial travel of said shift collar relative to said hub when said output member and said hub are not rotating relative to one another.

7. The synchronizer of claim 5, wherein said input friction element has at least one flange extending therefrom, each said at least one detent mechanism being engageable with a corresponding one of the flanges to engage said input friction element.

8. The synchronizer of claim 7, wherein axial movement of said shift collar toward said at least one output member presses each said at least one detent mechanism against the corresponding said at least one flange, in turn pressing said at least one input friction element against said at least one output friction element.

9. The synchronizer of claim 8, wherein said at least one detent mechanism is mounted on said hub and said at least one blocking insert is mounted on said shift collar.

10. The synchronizer of claim 9, wherein said at least one input friction element comprises a synchronizer ring and a plurality of clutch plates fixed for rotation with said synchronizer ring, said flange being formed on said synchronizer ring, and said at least one output element comprises a plurality of separator plates interleaved between said clutch plates.

11. The synchronizer of claim 10, wherein said synchronizer ring comprises a sheet metal cup with said flanges bent back from the sides of said cup.

12. The synchronizer of claim 1, wherein said synchronizer is a bi-direction synchronizer and further comprises an additional output member, at least one additional input friction element, and at least one additional output friction element, each said additional member and element being mounted on the opposite side of said hub from the corresponding original member and element in substantially the same fashion as said corresponding original member and element.

13. The synchronizer of claim 12, further comprising return means for biasing said at least one input friction element and said at least one additional input friction element towards each other.

14. The synchronizer of claim 13, wherein at least one additional flange is provided on each said input friction element and said biasing means comprises at least one spring interconnecting each such flange to a flange on the other input friction member.

15. A bi-directional synchronizer comprising:
    a hub;
    first and second output drums, each drum being mounted for rotation relative to said hub and said first drum being on an opposite side of said hub from said second drum;
    first and second synchronizer rings positioned between said hub and said first and second output drums, respectively, each said synchronizer ring being mounted for rotation relative to said hub and said output drums, and each said synchronizer ring having a plurality of flanges extending therefrom;
    first and second pluralities of clutch plates mounted for rotation with said first and second synchronizer rings, respectively;
    first and second pluralities of separator plates mounted for of said second plurality rotation with said first and second output drums, respectively, and interleaved between the clutch plates of said first and second pluralities of clutch plates, respectively;
    a shift collar fixed for rotation with said hub and being axially movable relative thereto, said shift collar being selectively engageable with either of said output drums;
    a plurality of detent mechanisms circumferentially spaced about said hub and biased towards said shift collar, each said detent mechanism being selectively engageable with said flanges on said synchronizer rings; and a plurality of blocking inserts spaced about an inner circumference of said shift collar, each said blocking insert being disposed adjacent to and engaged by a corresponding one of said detent mechanisms, and having:
  a groove formed therein for guiding said corresponding detent mechanism upon axial movement of said shift collar; and
  first and second protrusions, one on either side of said groove, serving as synchronizer stop means for limiting relative rotation between said synchronizer rings and said hub and as blocking means for blocking axial movement of said shift collar relative to said hub when said shift collar is moving axially towards one of said output drums which is rotating relative to said hub.

16. The synchronizer of claim 15, wherein said protrusions additionally serve as shift stop means for limiting axial movement of said shift collar relative to said hub when said shift collar is moved axially towards one of said output drums which is not rotating relative to said hub.

17. The synchronizer of claim 16, wherein each said protrusion has:
  inner and outer sides substantially parallel to a side of the blocking inserts, said inner side being adjacent to said groove;
  shift stop sides extending from and substantially perpendicular to the ends of said outer side;
  synchronizer ring stop sides extending from and substantially perpendicular to said shift stop sides; and
  guide shoulders extending between the ends of said synchronizer ring stop sides and said inner side.

18. The synchronizer of claim 17, wherein said guide shoulders are oriented substantially radially from the center of said blocking inserts.

19. The synchronizer of claim 17, wherein each blocking insert further comprises at least one protrusion on the side thereof facing towards the shift collar and said shift collar further comprises grooves for engaging said at least one protrusion to prevent axial and radially outward movement of said blocking insert relative to said shift collar, and wherein each said protrusion on the side of said blocking insert facing said hub has a flat top surface and said hub has notches to engage said flat top surfaces to prevent radially inward movement of said blocking inserts.

20. The synchronizer of claim 17, wherein said flanges on said synchronizer rings are narrower in width than the distance between said inner faces of said protrusions on said blocking inserts.

21. The synchronizer of claim 15, wherein said synchronizer ring is a cup-shaped piece of heavy-gauge sheet metal, said flanges being bent back from the sides of said cup.

22. The synchronizer of claim 21, wherein said flanges are formed in a U-shape, with one end of the U engaging said detent mechanism.

23. The synchronizer of claim 22, further comprising a second plurality of flanges extending from each said synchronizer ring and a plurality of springs interconnecting each flange of said second plurality with a corresponding flange on the other synchronizer ring.

24. A blocking insert comprising: a substantially flat main body having a front, a back, a top, a bottom, two sides and a center;
  a guide groove formed on the front of the main body, said guide groove extending from near the top of the main body to near the bottom of the main body; and
  two blocker protrusions formed on the front of the main body such that one of the protrusion is formed at each side of the main body and each protrusion having:
    (i) inner and outer sides substantially parallel to the corresponding side of the main body, the inner side being spaced from the side of the main body;
    (ii) top and bottom sides at the ends of and substantially perpendicular to said outer sides;
    (iii) top and bottom intermediate sides at the ends of and substantially perpendicular to the top and bottom sides, respectively, the top and bottom intermediate sides being spaced from the outer side a smaller distance than the inner side is spaced therefrom; and
    (iv) top and bottom slanted sides extending between the ends of the top and bottom intermediate sides respectively, and the ends of the inner sides.

25. The blocking insert of claim 24, further comprising a detent hole formed in said main body at the center thereof and extending from the front to the back thereof, said inner sides of said blocker protrusions being adjacent to the sides of said hole.

26. The blocking insert of claim 24, further comprising:
  a first orientation protrusion formed o the back of the main body and extending from the top to the bottom thereof, the first orientation protrusion being substantially in the shape of a segment of a cylinder;
  second and third substantially rectangular orientation protrusions formed on the back of the main body and extending from either side thereof towards the center of the main body; and
  grooves formed in the back of the main body on either sides of said second and third orientation protrusions.

27. The blocking insert of claim 24, wherein said main body is slightly arcuate from one of said sides to the other.

28. The blocking insert of claim 24, wherein said guide groove increases in depth and width from the top to the center and from the bottom to the center of the main body.

29. The blocking insert of claim 24, wherein said slanted sides of said protrusion are oriented substantially radially from the center of said blocking insert.

* * * * *

UNITED STATES PATENT AND TRADEMARK OFFICE
CERTIFICATE OF CORRECTION

PATENT NO. : 4,830,159

DATED : 16 May 1989

INVENTOR(S) : Douglas R. Johnson et al.

It is certified that error appears in the above-identified patent and that said Letters Patent is hereby corrected as shown below:

In column 10, line 55, delete "of said second plurality".

In column 12, line 3, after "flange", insert -- of said second plurality --.

In column 12, line 12, delete "protrusion" and insert therefor -- protrusions --.

Signed and Sealed this

Twelfth Day of March, 1991

Attest:

HARRY F. MANBECK, JR.

*Attesting Officer*   *Commissioner of Patents and Trademarks*